United States Patent
Shao et al.

(10) Patent No.: US 11,847,186 B2
(45) Date of Patent: Dec. 19, 2023

(54) METHODS AND SYSTEMS FOR OBTAINING USER EVULATION USED IN NATURAL GAS ENERGY MEASUREMENT

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Xiaojun Wei, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 58 days.

(21) Appl. No.: 17/649,339

(22) Filed: Jan. 28, 2022

(65) Prior Publication Data
US 2022/0164608 A1 May 26, 2022

(30) Foreign Application Priority Data

Feb. 4, 2021 (CN) .......................... 202110155165.6
Jan. 14, 2022 (CN) .......................... 202210045107.2

(51) Int. Cl.
G06F 18/21 (2023.01)
G06Q 50/06 (2012.01)
(Continued)

(52) U.S. Cl.
CPC ...... *G06F 18/2178* (2023.01); *G06F 11/3452* (2013.01); *G06F 18/214* (2023.01); *G06F 18/2193* (2023.01); *G06Q 50/06* (2013.01)

(58) Field of Classification Search
CPC ...... G06V 10/82; G06V 10/762; G06F 18/23; G06F 18/2413; G06F 11/3089;
(Continued)

(56) References Cited

U.S. PATENT DOCUMENTS 10,948,471 B1 * 3/2021 MacMullin ........ G01N 33/0047

FOREIGN PATENT DOCUMENTS

CN  105022021 A  11/2015
CN  107909376 A  4/2018
(Continued)

OTHER PUBLICATIONS

Zhang et al., CN 107274081 A1, "Performance evaluation method and device of natural gas pipe network", Date Published: Oct. 20, 2017 (Year: 2017).*

(Continued)

*Primary Examiner* — John H Le
(74) *Attorney, Agent, or Firm* — METIS IP LLC (57) ABSTRACT

The present disclosure provides a method and system for obtaining a user evaluation configured to a natural gas energy measuring. The method may include obtaining natural gas statistics data and regional user data during a preset time period in a target area; obtaining a user evaluation prediction result based on the natural gas statistics data and the regional user data by a user evaluation model; determining whether the user evaluation prediction result is abnormal based on an actual user evaluation; and if the user evaluation prediction result is abnormal, adjusting the user evaluation prediction result.

12 Claims, 7 Drawing Sheets

(51) Int. Cl.
*G06F 11/34* (2006.01)
*G06F 18/214* (2023.01)

(58) Field of Classification Search
CPC ............... G06F 18/214; G06F 18/2178; G06F 18/2193; G06Q 50/06
USPC .......................................................... 702/61
See application file for complete search history.

(56) References Cited

FOREIGN PATENT DOCUMENTS

| | | |
|---|---|---|
| CN | 110503238 A | 11/2019 |
| CN | 111008778 A | 4/2020 |
| CN | 111582911 A | 8/2020 |

OTHER PUBLICATIONS

First Office Action in Chinese Application No. 202110155165.6 dated Jan. 17, 2022, 16 pages.

\* cited by examiner

600 generating user service evaluation data for natural gas measuring data by integrating the natural gas measuring data with user opinion feedback data  ~610 analyzing a user opinion analysis model by the user service evaluation data for the natural gas measuring data, a natural gas measuring data sample set, and a user opinion feedback data sample set  ~620

METHODS AND SYSTEMS FOR OBTAINING USER EVULATION USED IN NATURAL GAS ENERGY MEASUREMENT

CROSS-REFERENCE TO RELATED APPLICATION

This application claims priority of Chinese Patent Applicant No. 202110155165.6 filed on Feb. 4, 2021, and Chinese Patent Applicant No. 202210045107.2 filed on Jan. 14, 2022, the contents of which are incorporated herein by reference in their entirety.

TECHNICAL FIELD

The present disclosure relates to the field of natural gas management, and more particularly, a method and system for obtaining a user evaluation configured to a natural gas energy measuring.

BACKGROUND

At present, with the rapid progress of the construction of intelligent natural gas networks, the GIS geographic information service platform for natural gas network is gradually promoted, implemented and applied. It realizes the unified collection of natural gas network resource information, provides geospatial information sharing and business application integration for the natural gas network "generating, transmission, transformation, distribution, utilization, and adjustment" and other links, and provides the spatial geographic information and network topology information of natural gas network equipment, which lays an important foundation for the improvement of natural gas network informatization and automation level. The purpose of the construction of the natural gas network is to improve the user experience of natural gas use, in other words, the construction and improvement of the natural gas network is closely related to the user experience. How to obtain user evaluations in a forward-looking manner in order to improve the construction of the natural gas network has become an urgent problem to be solved at present.

Therefore, there is a need to provide a method and system for obtaining a user evaluation configured to a natural gas energy measuring, to predict the user evaluation.

SUMMARY

In a first aspect of the present disclosure, a method for obtaining a user evaluation used in a natural gas energy measuring may be provided. The method may be implemented on at least one machine each of which has at least one processor and storage. The method may include obtaining natural gas statistics data and regional user data during a preset time period in a target region; obtaining a user evaluation prediction result based on the natural gas statistics data and the regional user data by a user evaluation model; determining whether the user evaluation prediction result is abnormal based on an actual user evaluation; and if the user evaluation prediction result is abnormal, adjusting the user evaluation prediction result.

In some embodiments, the adjusting the user evaluation prediction result includes adjusting the user evaluation prediction result based on a fault influence factor.

In some embodiments, the method further includes determining the fault influence factor based on the natural gas statistics data and a fault rate during the preset time period in the target area by a fault factor prediction model.

In some embodiments, the method further includes determining a label of a fault factor training sample for training the fault factor prediction model based on evaluation data with fault and evaluation data without fault.

In some embodiments, the method further includes generating user service evaluation data for natural gas measuring data by integrating the natural gas measuring data with user opinion feedback data; analyzing a user opinion analysis model by the user service evaluation data for the natural gas measuring data, a natural gas measuring data sample set, and a user opinion feedback data sample set.

In some embodiments, the integrating and generating the user service evaluation data for the natural gas measuring data based on the natural gas measuring data and the user opinion feedback data includes obtaining user positive evaluation data and user negative evaluation data by analyzing the natural gas measuring data and the user opinion feedback data based on a same opinion analysis manner; obtaining associated information data by associating the user positive evaluation data with the user negative evaluation data; obtaining the user service evaluation data for the natural gas measuring data by matrixing the associated information data.

In some embodiments, the obtaining user positive evaluation data and user negative evaluation data by analyzing the natural gas measuring data and the user opinion feedback data based on a same opinion analysis manner include obtaining the user positive evaluation data and the user negative evaluation data by analyzing the natural gas measuring data and the user opinion feedback data based on a reparameterization tricks; obtaining the associated information data by associating the user positive evaluation data with the user negative evaluation data through a variational self-analyzer.

In some embodiments, the obtaining the user positive evaluation data and the user negative evaluation data by analyzing the natural gas measuring data and the user opinion feedback data based on a reparameterization tricks includes determining standard deviations and mean values of distributions corresponding to the natural gas measuring data and the user opinion feedback data respectively; obtaining a parameter by a standard Gaussian distribution sampling of multi-sinusoidal variables; obtaining the user positive evaluation data and the user negative evaluation data by using the standard deviations and the mean values of the distributions corresponding to the natural gas measuring data and the user opinion feedback data and the parameter.

In some embodiments, the obtaining the user service evaluation data for the natural gas measuring data by the matrix the associated information data includes obtaining integrated information by using a divergence to interact with the user positive evaluation data and the user negative evaluation data in the associated information data; obtaining the user service evaluation data for the natural gas measuring data by performing matrixing on the integrated information.

In some embodiments, the integrating and generating the user service evaluation data for the natural gas measuring data based on the natural gas measuring data and the user opinion feedback data includes determining whether a person corresponding to the natural gas measuring data and a person corresponding to the user opinion feedback data are the same based on a similarity between user satisfaction data and user dissatisfaction data extracted from the user service evaluation data for natural gas measuring data; analyzing the user opinion analysis model by the user service evaluation data for the natural gas measuring data when the corresponding persons are the same.

In some embodiments, the analyzing the user opinion analysis model by the user service evaluation data for the natural gas measuring data, the natural gas measuring data sample set, and the user opinion feedback data sample set includes analyzing the user opinion model by an integrated loss function based on the user service evaluation data for the natural gas measuring data, the natural gas measuring data sample set, and the user opinion feedback data sample set; wherein the integrated loss function includes a first loss function and a second loss function, the first loss function is configured to supervise the analysis of the natural gas measuring data sample set and the user opinion feedback data sample set; the second loss function is configured to supervise the analysis of the user opinion model based on the user service evaluation data for the natural gas measuring data.

According to an aspect of the present disclosure, a system for obtaining a user evaluation used in a natural gas energy measuring is provided. The system may include at least one processor and executable instructions. The radiation treatment system may include a data obtaining module configured to obtain natural gas statistics data and regional user data during a preset time period in a target region; a user prediction module configured to obtain a user evaluation prediction result based on the natural gas statistics data and the regional user data by a user evaluation model; a prediction adjustment module configured to determine whether the user evaluation prediction result is abnormal based on an actual user evaluation; and if the user evaluation prediction result is abnormal, adjusting the user evaluation prediction result.

In some embodiments, the prediction adjustment module further includes adjusting the user evaluation prediction result based on a fault influence factor.

In some embodiments, the prediction adjustment module further includes determining the fault influence factor based on the natural gas statistics data and a fault rate by a fault factor prediction model.

In some embodiments, the prediction adjustment module further includes determining a label of a fault factor training sample for training the fault factor prediction model based on evaluation data with fault and evaluation data without fault.

In some embodiments, the prediction adjustment module further includes determining a label of a fault factor training sample for training the fault factor prediction model based on evaluation data with fault and evaluation data without fault.

In a third aspect of the present disclosure, a non-transitory computer readable medium may be provided. The non-transitory computer readable medium may include a computer reads the computer instructions in the computer-readable storage medium, the computer performs the method for obtaining a user evaluation used in a natural gas energy measuring.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 1:
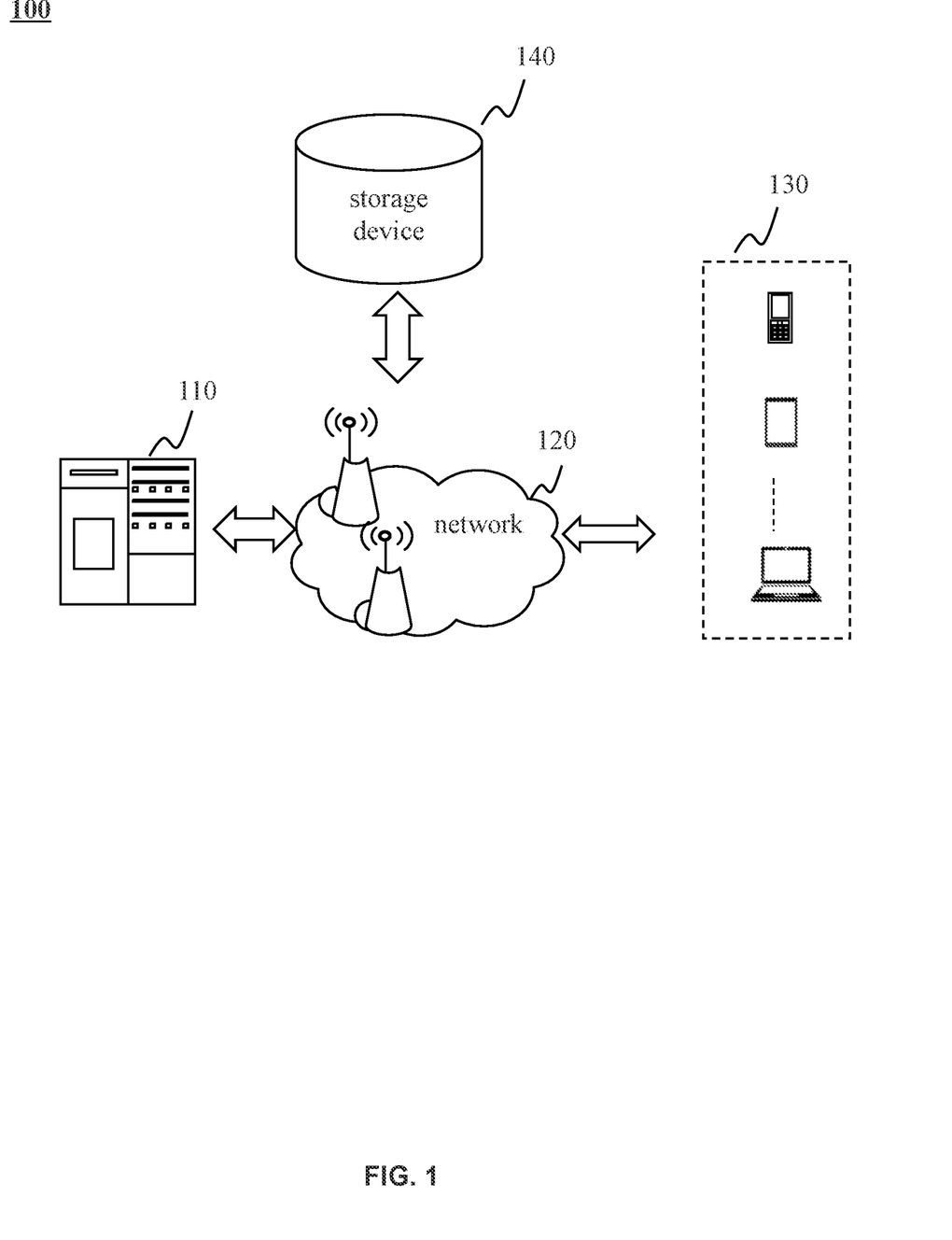
FIG. 1 is a schematic diagram of an application scenario 100 illustrating an exemplary system for obtaining a user evaluation configured to a natural gas energy measuring according to some embodiments of the present disclosure.

FIG. 1 is a schematic diagram of an application scenario 100 illustrating an exemplary system for obtaining a user evaluation configured to a natural gas energy measuring according to some embodiments of the present disclosure.

As shown in FIG. 1, in some embodiments, the application scenario 100 may include a server 110, a network 120, one or more terminal device 130, and a storage device 140.

The server 110 may be configured to process data and/or information from at least one component or external data source (e.g., a cloud data center) of the application scenario 100. For example, the server 110 may obtain natural gas statistics data and regional user data during a preset time period in a target area; obtaining a user evaluation prediction model based on the natural gas statistics data and the regional user data by a user evaluation model; determining whether the user evaluation prediction result is abnormal based on an actual user evaluation; and if the user evaluation prediction result is abnormal, adjusting the user evaluation prediction result. In some embodiments, during the processing, the server 110 may obtain data (e.g., instruction) from the storage device 140 or save the data (e.g., the user evaluation result) to the storage device 140, and may also read the data (e.g., the natural gas statistics data and the regional user data during the present time) from the terminal device 130 or transmit the data to the terminal device 130.

In some embodiments, the server 110 may be a single server or a server group. In some embodiments, the server 110 may be locally connected to the network 120 or remotely connected to the network 120. In some embodiments, the server 110 may be implemented on a cloud platform.

The network 120 may promote exchange of information and/or data. In some embodiments, one or more components (e.g., the server 110, the terminal device 130, etc.) in the application scenarios 100 may transmit information and/or data to another component in the application scenario 100 via the network 120.

The terminal devices 130 refers to the one or more terminal devices or software used by the user. In some embodiments, the terminal device 130 may be one or any combination of a mobile device, a tablet computer, a laptop, a desktop computer, or any combination of the device having an input and/or output function. In some embodiments, the terminal device 130 may be used as a display terminal of the user, which is configured to obtain and display the user evaluation prediction result determined by the server 110 via the network 120. The above examples are only configured to illustrate the breadth of the scope of the terminal device 130 and not to limit the scope thereof.

The storage device 140 may be configured to store data and/or instructions. In some embodiments, the storage device 140 may obtain data and/or instructions, such as the server 110, the terminal device 130, or the like. In some embodiments, the storage device 140 may store the server 110 to perform or use data and/or instructions to complete the exemplary methods described in the present disclosure.

In some embodiments, the storage device 140 may include a large capacity memory, a removable memory, volatile read/write memory, a read-only memory (ROM), or the like, or any combination thereof. In some embodiments, the storage device 140 may be implemented on the cloud platform.

Figure 2:
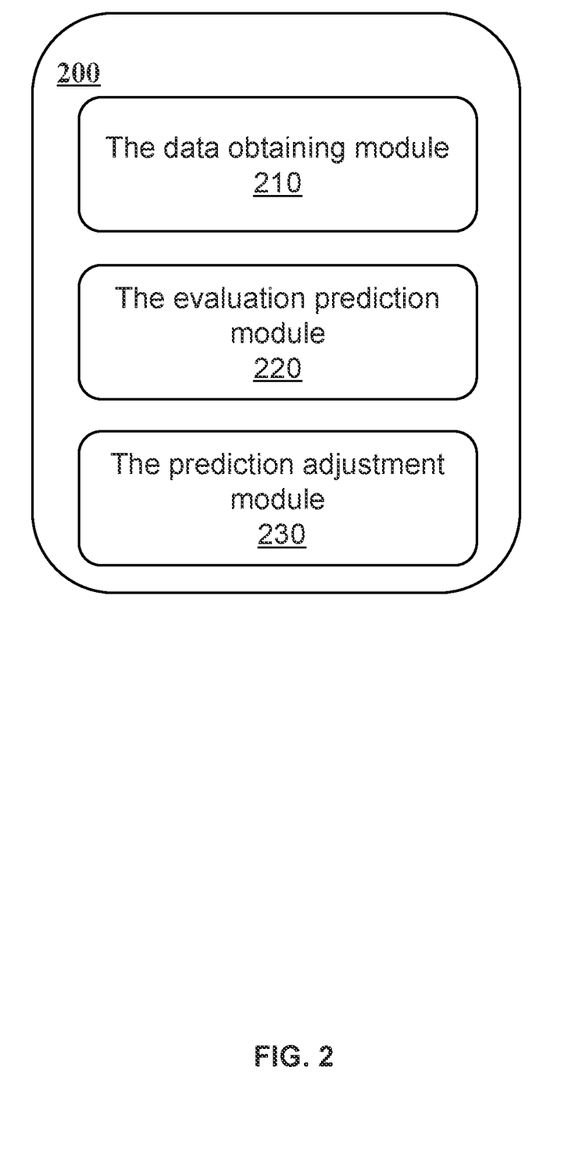
FIG. 2 is a block diagram illustrating an example the system 200 for obtaining the user evaluation used in the natural gas energy measuring according to some embodiments of the present disclosure.

FIG. 2 is a block diagram illustrating an example the system 200 for obtaining the user evaluation used in the natural gas energy measuring according to some embodiments of the present disclosure.

As shown in FIG. 2, in some embodiments, the system 200 for obtaining the user evaluation used in the natural gas energy measuring may include a data obtaining module 210, an evaluation prediction module 220, and a prediction adjustment module 230.

The data obtaining module 210 may be configured to obtain the natural gas statistics data and the regional user data during the preset time period in the target region.

The evaluation prediction module 220 may be configured to obtain the user evaluation prediction result based on the natural gas statistical data and the regional user data by the user evaluation prediction model.

The prediction adjustment module 230 may be configured to determine whether the user evaluation prediction result is abnormal based on an actual user evaluation, and if the user evaluation prediction result is abnormal, adjust the user evaluation prediction result. In some embodiments, the prediction adjustment module 230 may also be configured to adjust the user evaluation prediction result based on a fault influence factor. In some embodiments, the prediction adjustment module 230 may also be configured to determine the fault influence factor based on the natural gas statistics data and a fault rate by a fault factor prediction model. In some embodiments, the prediction adjustment module 230 may also be configured to determine a label for training the fault factor prediction models based on evaluation data with fault and evaluation data without fault.

Figure 3:
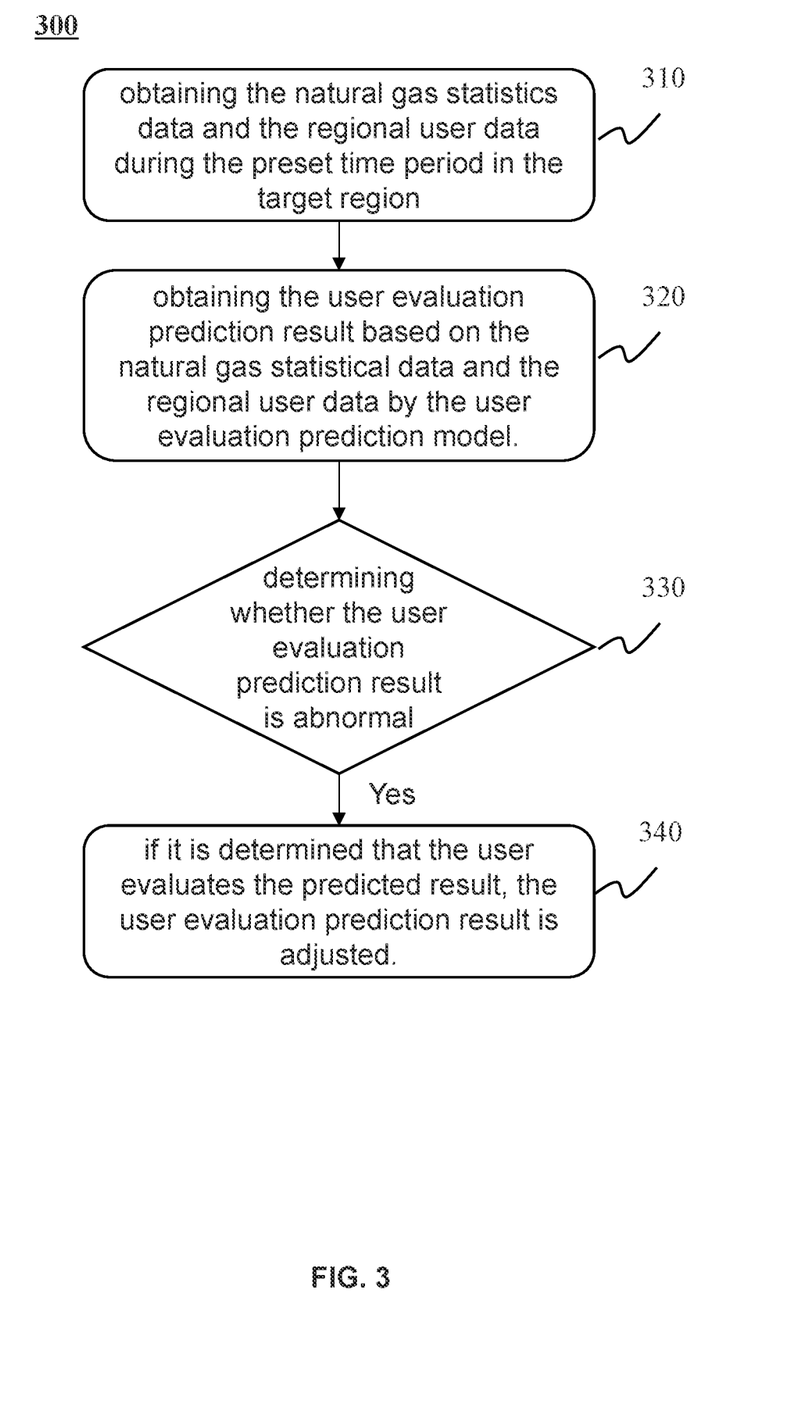
FIG. 3 is a flowchart illustrating an exemplary method 300 for obtaining the user evaluation used in the natural gas energy measuring according to some embodiments of the present disclosure.
Figure 4:
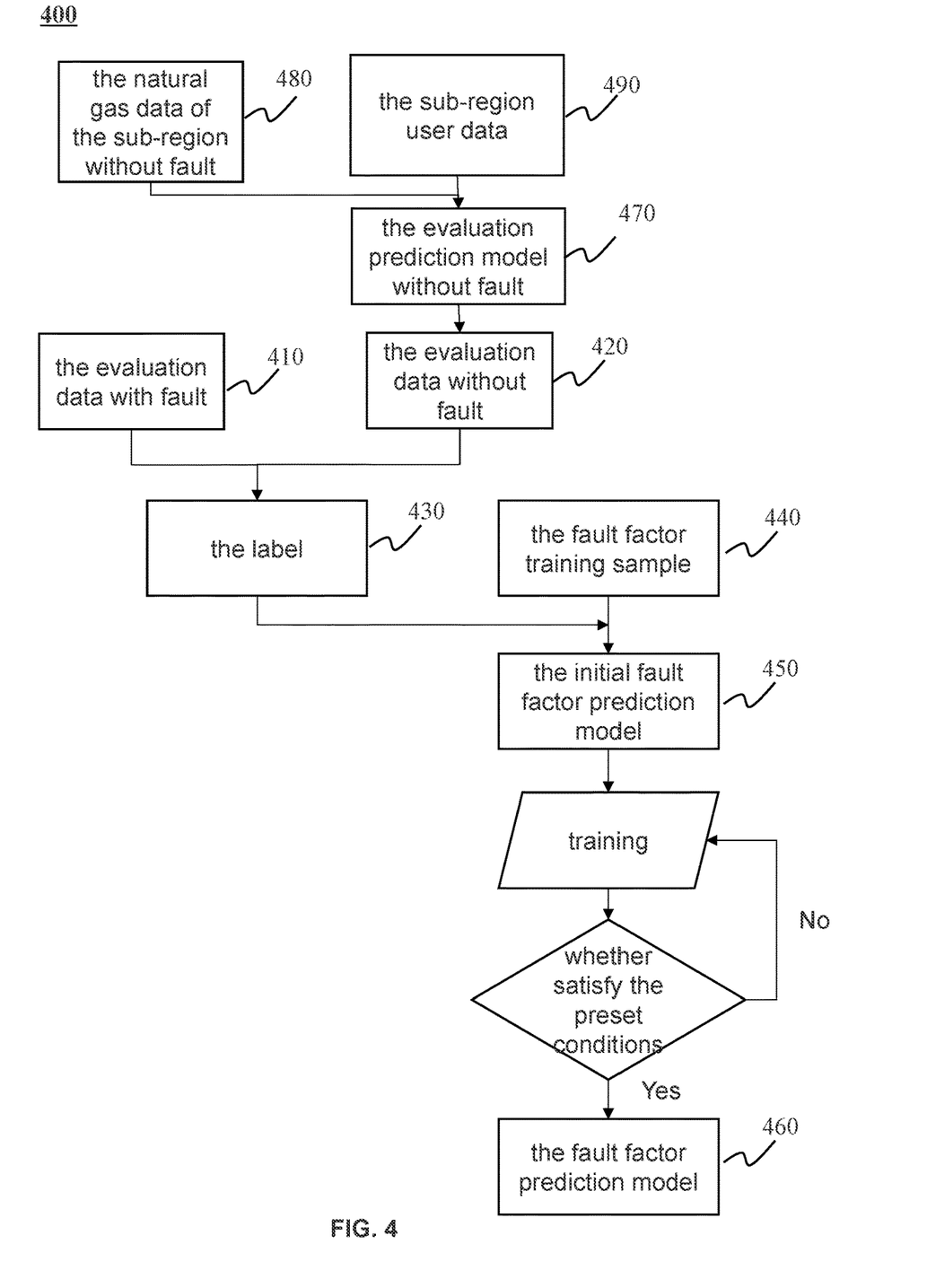
FIG. 4 is a flowchart illustrating an exemplary determining a label for training the fault factor prediction model based on evaluation data with fault and evaluation data without fault according to some embodiments of the present disclosure.

More descriptions of the data obtaining module 21, the evaluation prediction module 220, and the prediction adjustment module 230 may refer to FIG. 3, FIG. 4, and related descriptions, which may not be described here.

It should be noted that the above description of the system 200 and the module for obtaining the user evaluation used in the natural gas energy measuring, which is only for convenience and the present disclosure cannot be limited to the scope of the description. It may be appreciated that for those skilled in the art, the individual modules may be arbitrarily combined without departing from this principle or the subsystem is connected to other modules after understanding the principle of the system. In some embodiments, the data obtaining module 210, the evaluation prediction module 220, and the prediction adjustment module 230 disclosed in FIG. 2 may be the different modules in a system, or may also be the functions of the above two or more modules implemented in a module. For example, each module may share a storage module, and each module may also have the respective storage modules. Since this type of deformation is within the scope of the present disclosure.

FIG. 3 is a flowchart illustrating an exemplary method 300 for obtaining the user evaluation used in the natural gas energy measuring according to some embodiments of the present disclosure. As shown in FIG. 3, process 300 may include the following steps. In some embodiments, process 300 may be performed by method 300 for obtaining the user evaluation used in the natural gas energy measuring.

In 310, the natural gas statistics data and the regional user data may be obtained during the preset time period in the target region. In some embodiments, process 310 may be executed by the data obtaining module 210.

The target region may be a specific region. For example, the target region may be a province, a city, a county, a district, or a region of a certain size arbitrarily designated by humans. In some embodiments, the data obtaining module 210 may obtain the target region from the server 110, the terminal device 130, the storage device 140, or an external data source.

The preset time period may be a specific time period. For example, for a certain year, for a few months, for a few days. In some embodiments, the data acquisition module 210 can acquire a preset time period from the server 110, the terminal device 130, the storage device 140, or the external data source.

The natural gas statistics data may be information related to natural gas service provided to the target region. In some embodiments, the natural gas statistics data may include the types of the natural gas, the prices of the natural gas, the pressure of the natural gas, and the consumption of the natural gas.

In some embodiments, the data obtaining module 210 may obtain the natural gas statistics data from the server 110, the terminal device 130, the storage device 140, or the external data source.

The regional user data may be data related to the users in the target region. In some embodiments, the regional user data may include the number of the users, the type of the users, and the distribution data of the natural gas use, wherein the number of the users may characterize the number of users in the target region; the types of the user may characterize the type of each user in the target region, wherein the type of the user may include home users, commercial users (for example, hotels, restaurants, canteen, etc.). The distribution data of the natural gas usage may characterize a natural gas usage of each sub-region in the target region and a distribution of natural gas usage time in the region. In some embodiments, the distribution data of the natural gas usage may be expressed in the form of a heat map, a pie chart, a bar chart, or the like. It may be appreciated that the target region consists of a plurality of sub-regions and the sub-region may be a street, a building, or the like in the target region.

In some embodiments, the data obtaining module 210 may obtain the regional user data from the server 110, the terminal device 130, the storage device 140, or the external data source.

In 320, the user evaluation prediction result may be obtained based on the natural gas statistical data and the regional user data by the user evaluation prediction model. In some embodiments, process 320 may be executed by the evaluation prediction module 220.

The user evaluation prediction result may characterize a feedback from a natural gas usage experience of the user in the target region in the future. In some embodiments, the user evaluation prediction result may be expressed in the form of a score, a star number, or the like. It may be understood that the higher the score, the better the natural gas usage experience of the user in the target region; the more the stars, the better the natural gas use experiences of the user in the target region.

The user evaluation prediction model may be a machine learning model for predicting the user evaluation prediction results. In some embodiments, an input of the user evaluation prediction model may be the natural gas statistics data and the regional user data, and an output of the user evaluation prediction model may be the user evaluation prediction result.

In some embodiments, the evaluation prediction module 220 may train an initial user evaluation prediction model through a plurality of labeled evaluation prediction training samples, wherein an evaluation prediction training samples may correspond to the natural gas statistics data and the regional user data during a sample time period in a sample region, the labeled evaluation prediction training sample may include the user evaluation prediction result corresponding to this sample region in the sample time period. The label may be obtained by manually labeling, for example, the label may be manually labeled based on a historical user real evaluation.

In some embodiments, the evaluation prediction module 220 may perform a plurality of training on the initial user evaluation prediction model in a common manner (for example, gradient descent, etc.), until the trained initial user evaluation prediction model satisfies the preset condition, the trained initial user evaluation prediction model is used as the user evaluation prediction model for predicting the user evaluation prediction result. The preset condition may be that the loss function of the updated initial user evaluation prediction model is smaller than a threshold, converges, or the number of training iterations reaches a threshold.

In some embodiments, the user evaluation prediction may be one or any combination of a Variational auto-encoder (VAE), a neural network model, and a deep learning model, wherein the neural network model may include Convolutional Neural Network (CNN), Recurrent Neural Network (RNN), Multilayer Neural Network (MLP), Adversarial Neural Network (GAN), etc.

In 330, whether the user evaluation prediction result is abnormal may be determined. In some embodiments, process 330 may be executed by the prediction adjustment module 230.

The actual user evaluation may characterize the actual natural gas usage experience of the user in the target region in the preset time. It may be appreciated that the actual user evaluation may be determined based on the actual evaluation of multiple users. For example, if the number of the users who feedback the actual evaluation is 5, the actual user evaluation may be the average or median of the actual evaluation of the user.

In some embodiments, the actual user evaluation may be expressed by text, score, star number, or the like. In some embodiments, when the actual user evaluation is in the form of the text, the prediction adjustment module 230 may convert the text into the score or the star. In some embodiments, the prediction adjustment module 230 may convert the text of the actual user evaluation into a score or star based on a preset rule. The preset rule may characterize the correspondence between the text and the score or the star.

For example, the preset rule may include: if the actual user evaluation is "very poor", the corresponding score may be −5 or the corresponding star may be 0; if the actual user evaluation is "very satisfied", the corresponding score may be 5 or the corresponding star may be 5; if the actual user evaluation is "average", the corresponding score may be 0 or the corresponding star may be 3. In some embodiments, the actual user evaluations may be distributed on the area map of the target area in the form of the score or a thermal value.

In some embodiments, the prediction adjustment module 230 may obtain the actual user evaluation from the server 110, the terminal device 130, the storage device 140, or the external data source. In some embodiments, the actual user evaluation may be obtained from the user terminal used by the user, for example, collecting the actual user evaluation by the application used by the user.

In some embodiments, the prediction adjustment module 230 may determine whether the user evaluation prediction result is abnormal based on the actual user evaluation. In some embodiments, the prediction adjustment module 230 may compare the actual user evaluation and the user evaluation prediction result, and determine whether the user evaluation prediction result is abnormal. For example, the prediction adjustment module 230 may calculate a difference between the actual user evaluation and the user evaluation prediction result, and determine whether the user evaluation prediction result is abnormal based on the difference. For example, the prediction adjustment module 230 may calculate a score difference between the score corresponding to the user evaluation prediction result and the score corresponding to the actual user evaluation, and determine whether the score difference is within the preset score difference (e.g., −1~1), if the score difference is not within the preset score difference range, determining the user evaluation prediction result is abnormal. As another example, the prediction adjustment module 230 may calculate a star difference between the number of stars corresponding to the user evaluation prediction result and the number of stars corresponding to the actual user evaluation, and determine whether the star difference is within the preset star difference range (for example, −1~1), if the star difference is not within the preset star difference range, it is judged that the user evaluation prediction result is abnormal.

In 340, if it is determined that the user evaluation prediction result is abnormal, the user evaluation prediction result is adjusted. In some embodiments, process 340 may be executed by the prediction adjustment module 230.

In some embodiments, the manner of adjusting the user evaluation prediction result by the prediction adjustment module 230 may include: at least one of adjusting the user evaluation prediction result from positive to negative, increasing or decreasing the score corresponding to the user evaluation prediction result, increasing or decreasing the number of stars corresponding to the user evaluation prediction result, or etc.

In some embodiments, the prediction adjustment module 230 may adjust the user evaluation prediction result based on related data. In some embodiments, the related data may include the actual user evaluation. For example, the prediction adjustment module 230 may adjust the user evaluation prediction result based on the actual user evaluation. For example, the prediction adjustment module 230 may adjust the user evaluation prediction result to the user evaluation prediction result and the actual user evaluation.

In some embodiments, the related data may include a fault influence factor. In some embodiments, the prediction adjustment module 230 may adjust the user evaluation prediction result based on the fault influence factor. The fault influence factor may adjust a parameter of the user evaluation prediction based on a natural gas fault rate. For example, when the fault influence factor is 1, the prediction adjustment module 230 may increase the score corresponding to the user evaluation prediction result by one point or increase the number of stars by one star. As another example, when the fault influence factor is −2, the prediction adjustment module 230 may reduce the score of the user evaluation prediction results by two points or increase the number of stars by stars.

In some embodiments, the prediction adjustment module 230 may determine the fault influence factor by a fault factor prediction model based on the natural gas statistics data and a fault rate during the preset time period in the target region. The fault rate may characterize the frequency of the natural gas device in the preset time period in the target region. In some embodiments, the prediction adjustment module 230 may determine the fault rate based on data related to the fault of the natural gas device. For example, the data related to the fault of the natural gas device may include a time to stop the gas supply during the preset time period in the target region, and the prediction adjustment module 230 may determine the ratio of the time to stop the gas supply to the preset time period as the fault rate. For example, the data related to the natural gas device fault may include the total number of natural gas terminal devices and the number of faulted gas terminal devices, the prediction adjustment module 230 may the ratio of the number of faulted natural gas terminal devices to the total number of natural gas terminal devices is taken as the fault rate. In some embodiments, the prediction adjustment module 230 may obtain data related to the fault of the natural gas device from the server 110, the terminal device 130, the storage device 140, or the external data source.

In some embodiments, the prediction adjustment module 230 can acquire the fault rate directly from the server 110, the terminal device 130, the storage device 140, or the external data source.

In some embodiments, the prediction adjustment module 230 may train the initial user evaluation prediction model through a plurality of labeled fault factor training samples. In some embodiments, a label of a fault factor training sample may be the manual labeling.

Combined with FIG. 4, in some embodiments, the prediction adjustment module 230 may determine the label 430 of fault factor training sample 440 for training the fault factor prediction model 460 based on evaluation data with fault 410 and evaluation data without fault. The evaluation data with fault 410 may be the evaluations of the user who used the fault natural gas terminal device during the sample period of time in the sample region. The evaluation data without fault 420 may be evaluations of the user who used the non-fault natural gas terminal devices during the sample time period in the sample region. In some embodiments, the evaluation data with fault 410 and the evaluation data without fault 420 may be the score, the star, or the like.

It may be appreciated that the user who used the fault natural gas terminal device in the sample time period of the sample region may be used for multiple, and the prediction adjustment module 230 may determine the fault evaluation data 410 based on the number of user evaluations. For example, the prediction adjustment module 230 may take the average value of the evaluation of the plurality of the users as the evaluation data with fault 410. For example, the users who used the fault natural gas terminal device and submitted the evaluation in the sample time period X of the sample region A include User 1, User 2, and User 3. The evaluation of the user 1 is 3 stars, the evaluation of user 2 is 2 stars, and the evaluation of user 3 is 1 star, then there is fault evaluation data 410=(3+2+1)/3=2 stars corresponding to the sample time period X of sample region A.

It may be appreciated that the user of the sample time of the sample region may be configured to use the non-fault natural gas terminal device during the sample time period in the sample region, and the prediction adjustment module 230 may determine the evaluation data without fault 420 based on the plurality of the users. For example, the prediction adjustment module 230 may take the average value of the evaluation of the plurality of users as the evaluation data without fault 420.

In some embodiments, the prediction adjustment module 230 may obtain the evaluation data with fault 410 from the server 110, the terminal device 130, the storage device 140, or the external data source.

In some embodiments, the prediction adjustment module 230 may also predict the evaluation data with fault 420 of the fault factor training sample 440 based on an evaluation prediction model without fault 470. The input to the evaluation prediction model without fault 470 may be natural gas data 480 and sub-region user data 490 of the sub-region without fault of the fault factor training sample 440, the output of the evaluation prediction model without fault 470 may be the evaluation data without fault 420. The natural gas data 480 of the sub-region without fault may be the information related to the natural gas service of the sub-region without fault in the sample region corresponding to the fault factor training sample 440, for example, the type of the natural gas, the price of the natural gas, the pressure of the natural gas, and the consumption of the natural gas, etc., which is provided to the sub-region without fault. The sub-region user data 490 is data related to the user of the sub-region without fault in the sample region corresponding to the fault factor training sample 440, for example, the number of subspaces, the type of the user, and the distribution data of the natural gas use.

In some embodiments, the prediction adjustment module 230 may train the initial evaluation prediction model without fault with a plurality of labeled evaluation training samples without fault. An evaluation training sample without fault may correspond to the natural gas data and the sub-region user data of the sub-region without fault during the sample time period in the sample region, the label of the fault factor training sample may include the evaluation data without fault 420 corresponding to the sample time period of the sample region. In some embodiments, the label of the evaluation training sample without fault may be manual labeling.

In some embodiments, the prediction adjustment module 230 may perform multiple training on the initial evaluation prediction model without fault in a common manner (e.g., gradient descent, etc.), until the trained initial evaluation prediction model without fault may satisfy a preset condition, and the trained initial evaluation prediction model without fault is used as the evaluation prediction model without fault 470 for predicting the evaluation data without fault 420. The preset conditions may be that the loss function of the updated initial evaluation prediction model without fault is smaller than the threshold, the converge, or the number of training iterations reaches the threshold.

In some embodiments, the evaluation prediction model without fault may be one or any combination of a neural network model and a deep learning model, wherein the neural network model may include Convolutional Neural Network (CNN), Recurrent Neural Network (RNN), Multi-layer Neural Network (MLP), Adversarial Neural Network (GAN), or a combination of one or more.

In some embodiments, the evaluation data without fault corresponding to the fault factor training sample may be determined by predicting the evaluation data without fault quickly and accurately based on the evaluation prediction model without fault.

It may be appreciated that the prediction adjustment module 230 may also predict the evaluation data without fault during the preset time period in the target through the evaluation prediction model without fault.

In some embodiments, the prediction adjustment module 230 may determine the label 430 of the fault factor training sample 440 for training the fault factor prediction model 460 based on the difference between the evaluation data without fault 420 and the evaluation data with fault 410. For example, if the difference between the evaluation data without fault 420 of the fault factor training sample 440 and the evaluation data with fault 410 is −1, the label 430 of the fault factor training sample 440 is −1. As another example, if the difference between the evaluation data without fault 420 and the evaluation data with fault 410 of the fault factor training sample 440 is one star, the label 430 of the fault factor training sample 440 is 1.

In some embodiments, the labels 430 of the fault factor training samples 440 for training the fault factor prediction model 460 may be determined based on the evaluation data with fault 410 and the evaluation data without fault 420, which may make the labels 430 of the fault factor training samples 440 be more accurate, and the efficiency of training the fault factor prediction model 460 may be improved.

In some embodiments, the prediction adjustment module 230 may train the initial fault factor prediction model 450 multiple times in a common manner (e.g., the gradient descent, etc.), until the trained initial fault factor prediction model 450 may satisfy the preset conditions, and the trained initial fault factor prediction model 450 serves as the fault factor prediction model 460 for predicting the fault influence factor. The preset condition may be that the loss function of the updated initial fault factor prediction model 450 is smaller than the threshold, the converges, or the number of training iterations reaches a threshold.

In some embodiments, the evaluation prediction model without fault may be one or any combination of a neural network model and a deep learning model, wherein the neural network model may include Convolutional Neural Network (CNN), Recurrent Neural Network (RNN), Multi-layer Neural Network (MLP), Adversarial Neural Network (GAN), or a combination of one or more.

In some embodiments, the fault influence factor is determined based on the natural gas statistics data and the fault rate during the preset time period in the target region and may determine the fault influence factor quickly and accurately by the fault factor prediction model.

In some embodiments, adjusting the user evaluation result based on the fault influence factor, which may make the adjusted user evaluation result closer to the actual user experience.

In some embodiments, the user evaluation prediction result may be obtained based on the natural gas statistics data and the regional user data by the user evaluation model; determining whether the user evaluation prediction result is abnormal based on the actual user evaluation; and if the user evaluation prediction result is abnormal, adjusting the user evaluation prediction result, which achieves the prediction of the user evaluation, and provides a basis for the improvement of the construction of the natural gas network.

It should be noted that the description of the relevant process 300 is merely for example and description, without limiting the scope of the present disclosure. Process 300 may be made various modifications and changes may be made under the guidance of the present disclosure. However, these corrections and changes are still within the scope of the present disclosure.

Figure 5:
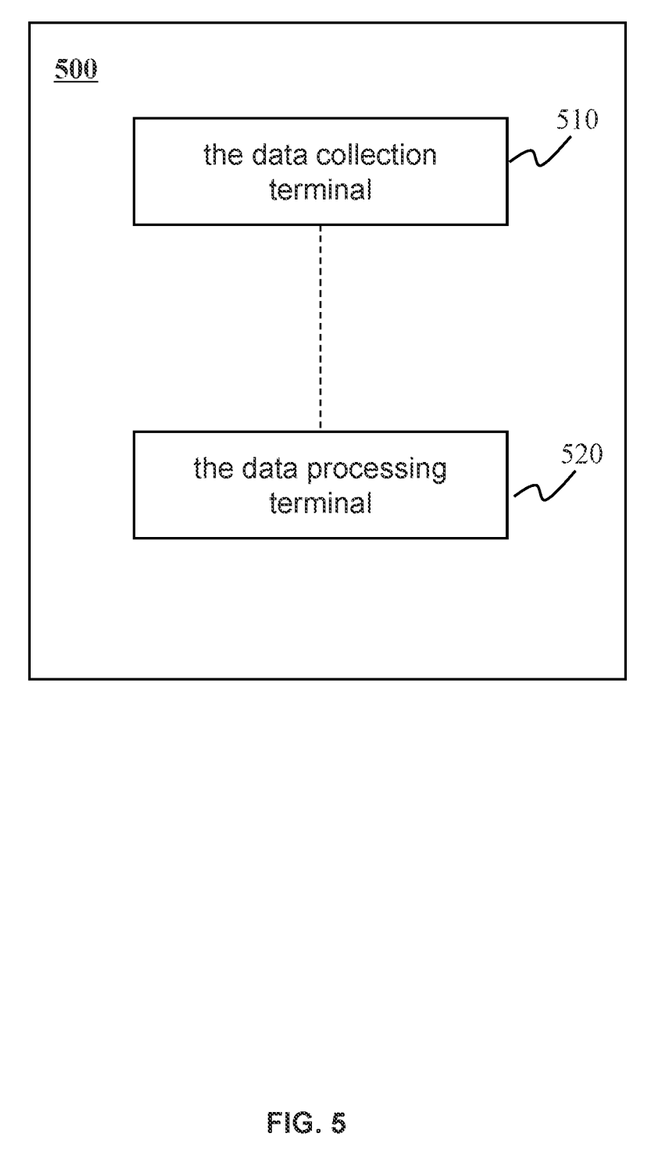
FIG. 5 is a schematic diagram illustrating the exemplary communication architecture of a natural gas energy measuring data information service system according to some embodiments of the present disclosure.

FIG. 5 is a schematic diagram illustrating the exemplary communication architecture of a natural gas energy measuring data information service system according to some embodiments of the present disclosure. As shown in FIG. 5, the application to the natural gas energy measuring data information service system 100 may include a data collection terminal 300 and a data processing terminal 200, the data collection terminal 300 may communicate with the data processing terminal 200.

In the particular embodiments, the data processing terminal 200 may be a desktop computer, a tablet computer, a notebook computer, a mobile phone, or other data collection terminals capable of data processing and data communication, which are not limited here.

Figure 6:
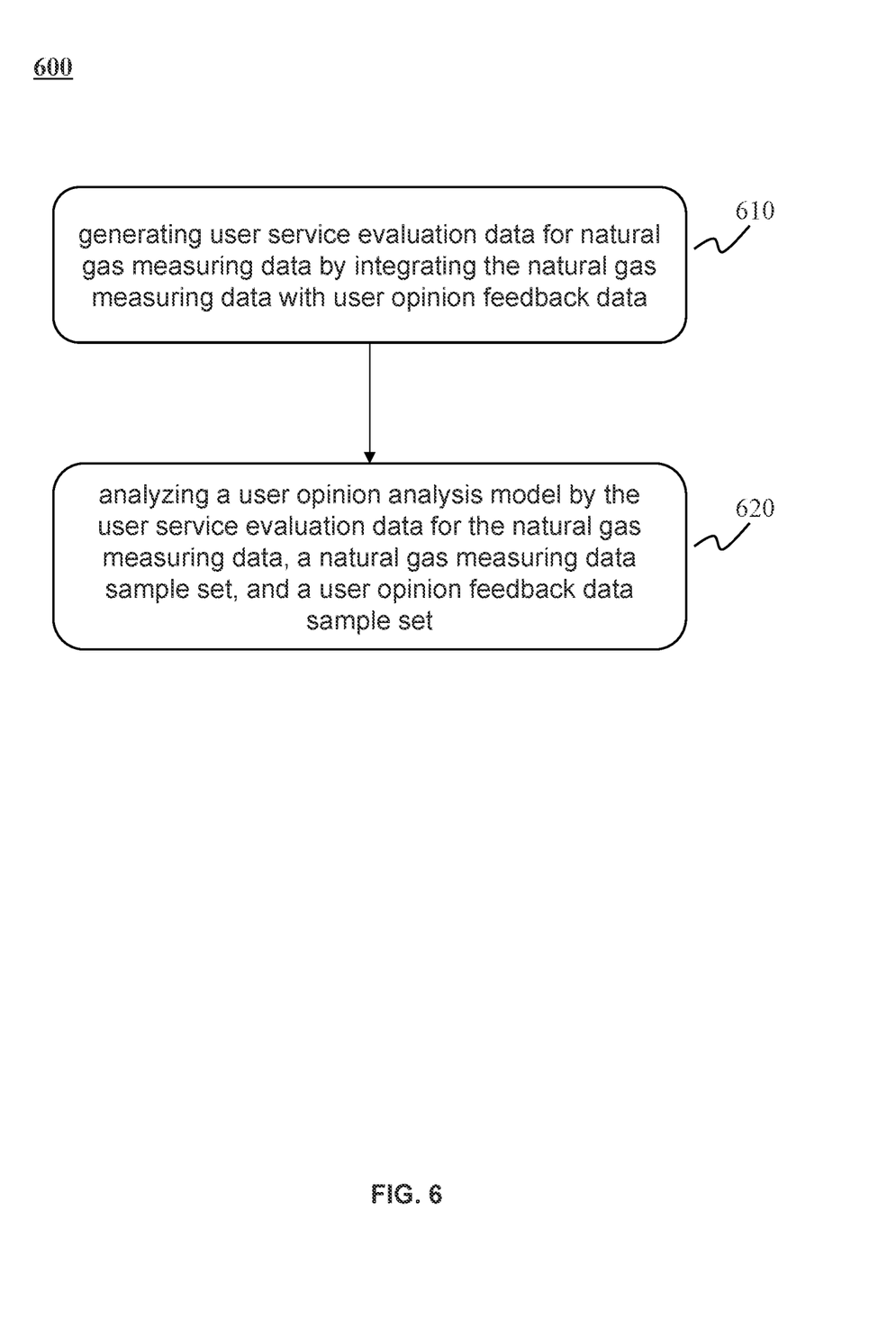
FIG. 6 is a flowchart illustrating the method for the natural gas energy measuring data information service according to some embodiments of the present disclosure.

FIG. 6 is a flowchart illustrating the method for the natural gas energy measuring data information service according to some embodiments of the present disclosure. As shown in FIG. 6, process 600 may include the following steps. In some embodiments, process 600 may be performed by a user evaluation obtaining system 200 that may be used for natural gas energy measuring.

In S610, service evaluation data for natural gas measuring data by a user (also referred to as user service evaluation data for natural gas measuring data) may be generated by integrating the natural gas measuring data with user opinion feedback data.

In S620, a user opinion analysis model may be analyzed by the user service evaluation data for the natural gas measuring data, a natural gas measuring data sample set, and a user opinion feedback data sample set.

It may be appreciated that when the content described in the above-described process S610 and process S620, the natural gas measuring data and user opinion feedback data are integrated to generate the service evaluation data for the natural gas measuring data; the user opinion analysis model is used for opinion analysis through the user service evaluation data for the natural gas measuring data, the natural gas measurement data sample set, and the user opinion feedback data sample set. By using the above method, the user opinion feedback information may be counted in a timely manner, the user feedback information may be processed, and the user feedback opinions may be obtained, which may obtain a satisfaction level of the user in time and make the response, and make the user experience better.

In the actual operation process, it may be found that when the natural gas measuring data and the user opinion feedback data are integrated, there is a technical problem of integration errors, so it is difficult to accurately generate the user service evaluation data for the natural gas measuring data. In order to solve the above technical problems, the step of integrating the natural gas measuring data and the user opinion feedback data to generate the user service evaluation data for the natural gas measuring data described in process S610 may specifically include the following processes S211-S213.

In S211, user positive evaluation data and user negative evaluation data may be obtained by analyzing the natural gas measuring data and the user opinion feedback data based on a same opinion analysis manner.

In S212, associated information data may be obtained by associating the user positive evaluation data with the user negative evaluation data.

In S213, the user service evaluation data for the natural gas measuring data may be obtained by matrixing the associated information data.

It may be understood that when the content described in the above processes S211-S213 is executed when the natural gas measuring data and the user opinion feedback data are integrated, the technical problem of integration errors is avoided so that the user service evaluation data for the natural gas measuring data may be accurately generated.

During the actual operation, user positive evaluation data and user negative evaluation data may be obtained by analyzing the natural gas measuring data and the user opinion feedback data based on a same opinion analysis manner. When associated the user positive evaluation data and the user negative evaluation data, there may exist a problem of association errors, so that it is difficult to obtain the associated information data correctly. In order to solve the above problem, as described in process S212, user positive evaluation data and user negative evaluation data may be obtained by analyzing the natural gas measuring data and the user opinion feedback data based on a same opinion analysis manner; and associated information data may be obtained by associating the user positive evaluation data with the user negative evaluation data, which may include the following step Q1.

In Q1, the user positive evaluation data and the user negative evaluation data may be obtained by analyzing the natural gas measuring data and the user opinion feedback data based on a reparameterization tricks; the associated information data may be obtained by associating the user positive evaluation data with the user negative evaluation data through a variational self-analyzer.

It may be appreciated that when the content described in the above-described process Q1, user positive evaluation data and user negative evaluation data by analyzing the natural gas measuring data and the user opinion feedback data based on a same opinion analysis manner; when associated the user positive evaluation data and the user negative evaluation data, there may exist a problem of association errors, which may obtain the associated information data correctly.

During the actual operation, it may be found that the user positive evaluation data and the user negative evaluation data may be obtained by analyzing the natural gas measuring data and the user opinion feedback data based on the same opinion analysis manner. when associated the user positive evaluation data and the user negative evaluation data, there may exist a problem of association errors, which may obtain the associated information data correctly.

During the actual operation, it may be found that when the user positive evaluation data and the user negative evaluation data may be obtained by analyzing the natural gas measuring data and the user opinion feedback data based on the reparameterization tricks, there may exist a problem of unreliable, which is difficult to reliably generate the user positive evaluation data and the user negative evaluation data. In order to solve the above problem, the process of obtaining the user positive evaluation data and the user negative evaluation data by analyzing the natural gas measuring data and the user opinion feedback data based on the reparameterization tricks in process Q1, which may specifically include the content described in the following processes W1 and W2.

In W1, standard deviations and mean values of distributions corresponding to the natural gas measuring data and the user opinion feedback data may be determined respectively; a parameter may be obtained by a standard Gaussian distribution sampling of multi-sinusoidal variables.

In W2, the user positive evaluation data and the user negative evaluation data may be obtained by using the standard deviations and the mean values of the distributions corresponding to the natural gas measuring data and the user opinion feedback data and the parameter.

It may be understood that when the content described in the above processes W1 and W2 is executed, the problem of unreliable analysis is avoided when analyzing the natural gas measuring data and the user opinion feedback data by the reparameterization tricks. Thereby, the user positive evaluation data and the user negative evaluation data may be reliably generated.

During the actual operation, it may be found that when matrixing the associated information data, there may exist the matrix errors, which may result in difficulty to obtain the user service evaluation data for the natural gas energy measuring data. In order to solve the above technical problem, the process of obtaining the user service evaluation data for the natural gas measuring data by matrixing the associated information data in S213, which may specifically include the content described in the following processes R1 and R2.

In R1, integrated information may be obtained by using a divergence to interact with the user positive evaluation data and the user negative evaluation data in the associated information data.

In R2, the user service evaluation data may be obtained for the natural gas measuring data by performing matrixing on the integrated information.

It may be understood that when the content described in the above processes R1 and R2 is executed, the problem of matrix errors is avoided when the related information data is matrixed, so that the user service evaluation for the natural gas measuring data may be accurately obtained.

The user service evaluation data for the natural gas measuring data is generated by integrating the natural gas measuring data and the user feedback data based on the above basis, and then the following processes D1 and D2 may be included.

In D1, whether a person corresponding to the natural gas measuring data and a person corresponding to the user opinion feedback data are the same may be determined based on a similarity between user satisfaction data and user dissatisfaction data extracted from the user service evaluation data for natural gas measuring data.

In D2, the user opinion analysis model may be analyzed by the user service evaluation data for the natural gas measuring data when the corresponding persons are the same.

It may be appreciated that when the content described in processes D1 and step D2 is executed, the service evaluation data may be statistically increased in time, and the statistical speed of data is improved.

During the actual operation, it may be found that when analyzing the user opinion analysis model by the user service evaluation data for the natural gas measuring data, the natural gas measuring data sample set, and the user opinion feedback data sample set, there may exist analyzing errors, which may result in difficult to obtained the opinion analysis correctly. In order to solve the above technical problem, the process of analyzing the user opinion analysis model by the user service evaluation data for the natural gas measuring data, the natural gas measuring data sample set, and the user opinion feedback data sample set in S620, which may specifically include the content described in the following processes S221 and S222.

In S221, the user opinion model by an integrated loss function may be analyzed based on the user service evaluation data for the natural gas measuring data, the natural gas measuring data sample set, and the user opinion feedback data sample set.

In S222, wherein the integrated loss function includes a first loss function and a second loss function, the first loss function is configured to supervise the analysis of the natural gas measuring data sample set and the user opinion feedback data sample set; the second loss function is configured to supervise the analysis of the user opinion model based on the user service evaluation data for the natural gas measuring data It may be understood that when the content described in the above processes S221 and S222 is executed, the problem of analyzing errors is avoided when analyzing the user opinion based on the user service evaluation data for the natural gas measuring data, the natural gas measuring data sample set, and the user opinion feedback data sample set, so that the user service evaluation for the natural gas measuring data may be accurately obtained.

Based on the same inventive concept, the user evaluation obtaining system that may be used for natural gas energy measurement is also provided, including: a user platform, a service platform, a management platform, a sensor network platform, and a perception control platform, wherein the user platform is communicatively connected to the service platform, the service platform is communicatively connected to the management platform, the management platform is communicatively connected to the sensor network platform, the sensor network platform and the perception control platform communication connection, the service platform further includes the data collection terminal and the data processing terminal, the data collection terminal and the data processing terminal are connected in communication, wherein the data processing terminal may be configured to generate the user service evaluation data for the natural gas measuring data by integrating the natural gas measuring data with the user opinion feedback data; analyzing the user opinion analysis model by the user service evaluation data for the natural gas measuring data, the natural gas measuring data sample set, and the user opinion feedback data sample set.

In some embodiments, a method and system for obtaining the user evaluation used in the natural gas energy measuring, wherein the user service evaluation data for the natural gas measuring data may be generated by integrating the natural gas measuring data with the user opinion feedback data; analyzing the user opinion analysis model by the user service evaluation data for the natural gas measuring data, the natural gas measuring data sample set, and the user opinion feedback data sample set. By using the above method, the user feedback information may be counted in a timely manner, the user feedback information may be processed, and the user feedback opinions may be obtained.

Based on the same inventive concept, the natural gas energy measuring data information service system is also provided, including: the user platform, the service platform, the management platform, the sensor network platform, and the perception control platform, wherein the user platform is communicatively connected to the service platform, the service platform is communicatively connected to the management platform, the management platform is communicatively connected to the sensor network platform, the sensor network platform and the perception control platform communication connection, the service platform further includes the data collection terminal and the data processing terminal, the data collection terminal and the data processing terminal are connected in communication, wherein the data processing terminal may be configured to:

generating the user service evaluation data for the natural gas measuring data by integrating the natural gas measuring data with user opinion feedback data;

analyzing the user opinion analysis model by the user service evaluation data for the natural gas measuring data, the natural gas measuring data sample set, and the user opinion feedback data sample set.

Based on the same inventive concept described above, please refer to FIG. 7, a functional block diagram of a natural gas energy measuring data information service device 700 is also provided. The detailed description of the natural gas energy measuring data information service device 700 is as follows.

Figure 7:
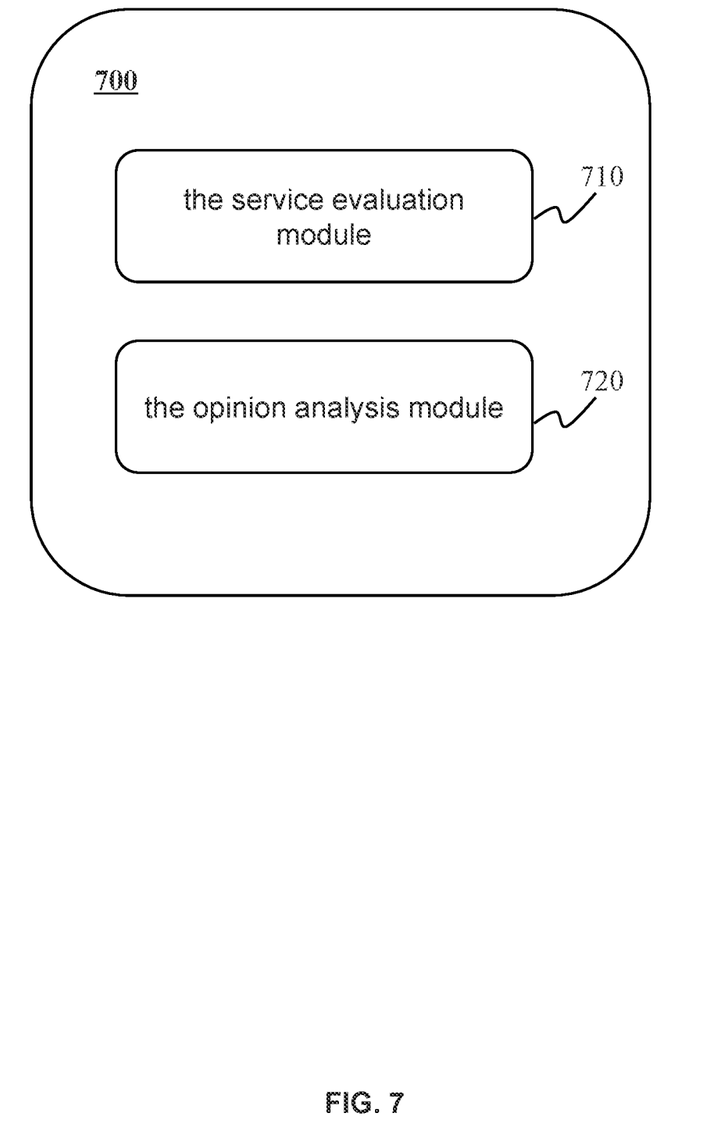
FIG. 7 is an exemplary block diagram illustrating the system for the natural gas energy measuring data information service system according to some embodiments of the present disclosure.

FIG. 7 is an exemplary block diagram illustrating the system for the natural gas energy measuring data information service system according to some embodiments of the present disclosure. As shown in FIG. 7, the natural gas energy measuring data information service device 700, which applied to the data processing terminal, wherein the device 700 may include:

a service evaluation module 710 configured to generate user service evaluation data for natural gas measuring data by integrating the natural gas measuring data with the user opinion feedback data;

an opinion analysis module 720 configured to analyze a user opinion analysis model by the user service evaluation data for the natural gas measuring data, a natural gas measuring data sample set, and a user opinion feedback data sample set.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for obtaining a user evaluation used in a natural gas energy measuring, implemented on a computing device including a storage device and at least one processor, the method comprising:
obtaining natural gas statistics data and regional user data during a preset time period in a target region;
obtaining a user evaluation prediction result based on the natural gas statistics data and the regional user data by a user evaluation model;
determining whether the user evaluation prediction result is abnormal based on an actual user evaluation; and
if the user evaluation prediction result is abnormal, adjusting the user evaluation prediction result, wherein the adjusting the user evaluation prediction result includes:
adjusting the user evaluation prediction result based on a fault influence factor; and
determining the fault influence factor based on the natural gas statistics data and a fault rate during the preset time period in the target region by a fault factor prediction model.

2. The method of claim 1, wherein the method further includes:
determining a label of a fault factor training sample for training the fault factor prediction model based on evaluation data with fault and evaluation data without fault.

3. The method of claim 1, wherein the method further includes:
generating user service evaluation data for natural gas measuring data by integrating the natural gas measuring data with user opinion feedback data;
analyzing a user opinion analysis model by the user service evaluation data for the natural gas measuring data, a natural gas measuring data sample set, and a user opinion feedback data sample set.

4. The method of claim 3, wherein the integrating and generating the user service evaluation data for the natural gas measuring data based on the natural gas measuring data and the user opinion feedback data includes:
obtaining user positive evaluation data and user negative evaluation data by analyzing the natural gas measuring data and the user opinion feedback data based on a same opinion analysis manner;
obtaining associated information data by associating the user positive evaluation data with the user negative evaluation data;
obtaining the user service evaluation data for the natural gas measuring data by matrixing the associated information data.

5. The method of claim 4, wherein the obtaining user positive evaluation data and user negative evaluation data by analyzing the natural gas measuring data and the user opinion feedback data based on a same opinion analysis manner include:
obtaining the user positive evaluation data and the user negative evaluation data by analyzing the natural gas measuring data and the user opinion feedback data based on a reparameterization tricks; obtaining the associated information data by associating the user positive evaluation data with the user negative evaluation data through a variational self-analyzer.

6. The method of claim 5, wherein the obtaining the user positive evaluation data and the user negative evaluation data by analyzing the natural gas measuring data and the user opinion feedback data based on a reparameterization tricks includes:

determining standard deviations and mean values of distributions corresponding to the natural gas measuring data and the user opinion feedback data, respectively;
obtaining a parameter by a standard Gaussian distribution sampling of multi-sinusoidal variables;
obtaining the user positive evaluation data and the user negative evaluation data by using the standard deviations and the mean values of the distributions corresponding to the natural gas measuring data and the user opinion feedback data and the parameter.

7. The method of claim 4, wherein the obtaining the user service evaluation data for the natural gas measuring data by the matrix the associated information data includes:
obtaining integrated information by using a divergence to interact with the user positive evaluation data and the user negative evaluation data in the associated information data;
obtaining the user service evaluation data for the natural gas measuring data by performing matrixing on the integrated information.

8. The method of claim 3, wherein the integrating and generating the user service evaluation data for the natural gas measuring data based on the natural gas measuring data and the user opinion feedback data includes:
determining whether a person corresponding to the natural gas measuring data and a person corresponding to the user opinion feedback data are the same based on a similarity between user satisfaction data and user dissatisfaction data extracted from the user service evaluation data for natural gas measuring data;
analyzing the user opinion analysis model by the user service evaluation data for the natural gas measuring data when the corresponding persons are the same.

9. The method of claim 3, wherein the analyzing the user opinion analysis model by the user service evaluation data for the natural gas measuring data, the natural gas measuring data sample set, and the user opinion feedback data sample set includes:
analyzing the user opinion model by an integrated loss function based on the user service evaluation data for the natural gas measuring data, the natural gas measuring data sample set, and the user opinion feedback data sample set;
wherein the integrated loss function includes a first loss function and a second loss function, the first loss function is configured to supervise the analysis of the natural gas measuring data sample set and the user opinion feedback data sample set; the second loss function is configured to supervise the analysis of the user opinion model based on the user service evaluation data for the natural gas measuring data.

10. A system for obtaining a user evaluation used in a natural gas energy measuring, comprising:
at least one storage device including a set of instructions;
at least one processor in communication with the at least one storage device, wherein when executing the set of instructions, the at least one processor is configured to cause the system to perform operation comprising:
obtaining natural gas statistics data and regional user data during a preset time period in a target region;
obtaining a user evaluation prediction result based on the natural gas statistics data and the regional user data by a user evaluation model;
determining whether the user evaluation prediction result is abnormal based on an actual user evaluation; and if the user evaluation prediction result is abnormal, adjusting the user evaluation prediction result, wherein to adjust the user evaluation prediction result, the at least one processor is configured to cause the system to perform operation comprising:

adjusting the user evaluation prediction result based on a fault influence factor; and determining the fault influence factor based on the natural gas statistics data and a fault rate during the preset time period in the target region by a fault factor prediction model.

11. The system of claim 10, wherein to adjust the user evaluation prediction result, the at least one processor is configured to cause the system to perform at least one operation comprising:

determining a label of a fault factor training sample for training the fault factor prediction model based on evaluation data with fault and evaluation data without fault.

12. A non-transitory computer readable medium storing instructions, when executed by at least one processor, causing the at least one processor to implement a method comprising:

obtaining natural gas statistics data and regional user data during a preset time period in a target region;

obtaining a user evaluation prediction result based on the natural gas statistics data and the regional user data by a user evaluation model;

determining whether the user evaluation prediction result is abnormal based on an actual user evaluation; and if the user evaluation prediction result is abnormal, adjusting the user evaluation prediction result, wherein the adjusting the user evaluation prediction result includes:

adjusting the user evaluation prediction result based on a fault influence factor; and determining the fault influence factor based on the natural gas statistics data and a fault rate during the preset time period in the target region by a fault factor prediction model.

* * * * *